US007623511B2

(12) United States Patent
Reinefeld et al.

(10) Patent No.: US 7,623,511 B2
(45) Date of Patent: Nov. 24, 2009

(54) DEVICE AND METHOD FOR RETRIEVING/STORING ELECTRONIC DATA IN A SYSTEM WITH A PLURALITY OF DATA PROCESSING UNITS

(75) Inventors: Alexander Reinefeld, Berlin (DE); Florian Schintke, Berlin (DE); Thorsten Schutt, Berlin (DE)

(73) Assignees: Konrad-Zuse-Zentrum fuer Informationstechnik, Berlin (DE); Humboldt-Universitaet zu, Berlin (DE)

( * ) Notice: Subject to any disclaimer, the term of this patent is extended or adjusted under 35 U.S.C. 154(b) by 496 days.

(21) Appl. No.: 11/485,904

(22) Filed: Jul. 13, 2006

(65) Prior Publication Data

US 2007/0165619 A1 Jul. 19, 2007

(30) Foreign Application Priority Data

Jul. 14, 2005 (EP) ................................. 05015324
Aug. 11, 2005 (EP) ................................. 05017542

(51) Int. Cl.
*H04L 12/50* (2006.01)
*H04Q 11/00* (2006.01)

(52) U.S. Cl. ...................................... 370/368
(58) Field of Classification Search .................. 370/368
See application file for complete search history.

(56) References Cited

U.S. PATENT DOCUMENTS

| 6,772,141 | B1 | 8/2004 | Pratt et al. |
| 7,203,871 | B2 * | 4/2007 | Turner et al. ................. 714/710 |
| 2004/0054807 | A1 * | 3/2004 | Harvey et al. ................ 709/243 |
| 2004/0064556 | A1 | 4/2004 | Zhang et al. |

FOREIGN PATENT DOCUMENTS

WO 2004027581 A2 4/2004

WO 2005057427 A1 6/2005

OTHER PUBLICATIONS

Ion Stoica et al, Chord: a Scalable Peer-to-peer Lookup Protocol for Internet Applications, IEEE/ACM Transactions on Networking, Feb. 2003, vol. 11, pp. 17-32.

(Continued)

*Primary Examiner*—Dang T Ton
*Assistant Examiner*—Frederick Ott
(74) *Attorney, Agent, or Firm*—Sutherland, Asbill & Brennan, LLC (57) ABSTRACT

The invention relates to a device and a method for retrieving/storing electronic data in a system with a plurality of data processing units, which each implement a functionality of a read-write memory. The device comprises a system of a plurality of data processing units, which each comprise a read-write memory for recording/outputting objects comprising electronic data with processor means and storage means, and physical data exchange links between the plurality of data processing units, wherein a virtual network is formed in the system, in which network the plurality of data processing units are provided as a series arrangement with a sequence of a plurality of memories (S0, ..., Sn; n>2), in which a first memory (S0) is arranged next to a last memory (Sn), and, in which in each of the plurality of memories (S0, ..., Sn) a routing table (302) is formed, which table includes entries comprising electronic reference information concerning communication links (303) between one memory corresponding to the routing table (302) and others of the plurality of memories (SO, ..., Sn), and each of the plurality of memories (SO, ..., Sn) is assigned a name range of a corresponding name space for names of the objects. For each memory (Sx; x=0, 1, ...; $0 \leq x \leq n$) of the plurality of memories (S0, ..., Sn) in the virtual network, the entries $E_{Sx}[k]$ (k=0, 1, ...) containing electronic reference information in the corresponding routing table (302) are formed as follows:
  entry $E_{Sx}[0]$=reference to communication link to the memory (Sx+1), which is next in the sequence;
  entry $E_{Sx}[1]$=entry $E_{Sx+1}[0]$;
  entry $E_{Sx}[m]$=entry $E_{Sv}[m-1]$ in a further memory (Sv), to which an entry $E_{Sx}[m-1]$ in the memory (Sx) refers, wherein $1 \leq m \leq k$.

14 Claims, 5 Drawing Sheets

OTHER PUBLICATIONS

Ashwin R. Bharambe et al, Mercury: Supporting Scalable Multi-Attribute Range Queries, SIGCOMM 2004, Aug. 30-Sep. 3, 2004, Portland, OR, pp. 1-14.

Hari Balakrishnan et al, Looking Up Data in P2P Systems, Communications of the ACM, Feb. 2003, vol. 46, No. 2, pp. 43-48.

* cited by examiner

DEVICE AND METHOD FOR RETRIEVING/STORING ELECTRONIC DATA IN A SYSTEM WITH A PLURALITY OF DATA PROCESSING UNITS

CROSS REFERENCE TO RELATED APPLICATION

Applicants hereby claim priority under 35 U.S.C. 119(a) to European Patent Application No. EB 05015324.6, filed Jul. 14, 2005, the disclosure of which is expressly incorporated herein by reference in its entirety.

FIELD OF THE INVENTION

The invention relates to a device and a method for retrieving/storing electronic data in a system with a plurality of data processing units, which each implement a functionality of read-write memory.

BACKGROUND OF THE INVENTION

The basic methods, which are used in peer-to-peer (P2P) computing, have many useful properties, which make them ideal candidates to form the basis of large distributed systems and grid systems: scalability, fault tolerance and self-organization. In P2P systems, the boundary between the role of a user and that of a service provider is blurred. When a user enters a P2P system, he also becomes active as a service provider at the same time, and thus increases the overall capacity of the system. As a result, the system also scales as the number of memories changes dynamically. In P2P systems, a stable, reliable overall system is formed by means of equal individual components, namely read-write memories, which can also be referred to as memories for short. The memories are connected via communication links and can go out of action independently of one another and without any prior notice, which means that they are unreliable. Unreliability of memories can be caused either by communication faults, which mean that one memory can no longer be reached by other memories, or by a fault or a decision made by one memory no longer to react to queries from other memories. New memories can be added to the system at any time.

One significant problem in the field of P2P computing is that of constructing, on the basis of unreliable memories, a reliable global data structure, in which objects can be stored and retrieved.

An object in this context consists of a name and a list of attributes. Objects may represent anything, for example may contain the address or the details of users, computers, networks, services or other objects. A name may be of any data type, but is usually a string of characters or a number. An attribute in turn consists of an attribute name and an attribute value, which may also be of any data type. Objects, which do not fit into this scheme, can easily be modeled thereon by storing the entire content of the object as an attribute "content". A list of attributes belonging to an object having the name "Martin Schmidt" could therefore appear as follows: ("First name", "Martin"), ("Surname", "Schmidt"), ("Street", "Main Street"), ("House number", "42"), ("Postcode", "12345"), ("Town", "Berlin").

Hereinafter a distinction will be made between two types of search processes: name service and directory service. A name service offers mapping between names and attributes. The name service makes it possible, for a given name, to query all the attributes of the corresponding object.

A directory service is the opposite of the name service. In this case a search for objects is carried out on the basis of one or more of their attributes. The result is a list of names. With a directory service, it is possible to respond to questions of the following type: "Show me all PDF documents, which are stored on this computer and which were written by Donald Knuth prior to 1995". A directory service is similar to the yellow pages. Microsoft's Active Directory Services, X.500 and the leaner variant LDAP are typical examples.

In order to scale to several million memories and to tolerate the addition/removal of memories, without any loss of functionality or efficiency, a distribution scheme is required, which specifies which objects are stored on which memory or memories, and also a routing method, which makes it possible to find the memories, which have stored the objects when a search is carried out for the latter. To this end, such a system generally comprises three components: a search processor, a routing layer and a database.

The search processor receives queries and maps the queries onto the underlying routing layer. Simple queries such as "Martin Schmidt" for example are forwarded directly, whereas more complex queries, such as the abovementioned query concerning the PDF documents written by Knuth, are broken down into a number of steps, which are worked through individually.

The routing layer is located between the search processor and the database. It is required in distributed systems in order to find the memories, which contain the required objects. In the Domain Name Service (DNS) of the Internet, which finds the respective Internet address in relation to computer names, the routing layer is implemented for example as a hierarchy of memories. Starting from a central memory, the responsibility branches in a number of steps to other memories until the memory, which has stored the object sought is reached. For routing in P2P systems, use is made for example of chordal graphs or multidimensional tori or hypercubes.

The database contains the actual objects of a memory.

Existing systems and methods for routing in P2P systems, such as Network Flooding (Gnutella), Superpeer Networks (KaZaA, FastTrack), unstructured routing with caching for anonymous file sharing (Freenet), Skip Lists (Chord, DKS), tree-like data structures (Kademlia, Pastry, Tapestry), multidimensional coordinate spaces (CAN) and a few others, differ from one another in terms of efficiency and scalability. In particular, the higher the number of communications that are necessary between memories via communication links in order to find objects, the more negative the effect on efficiency.

Many current P2P systems are based on distributed hash tables (DHTs) and chordal graphs. When a new object is stored, its name is converted into a numerical value by means of the hash function. Using the routing method, the memory, which is responsible for this value, is then determined, and the object is then entered in the database in this memory. Objects are found by analogy as follows: the name of the object sought is converted into a numerical value by means of the hash function, and the memory responsible for said numerical value is determined by means of the routing method. The object can then be read from the database of this memory.

For the routing method, each memory has a so-called routing table containing information as to how other memories can be contacted. The routing table has a limited size and contains the communication links to $O(\log(N))$ other memories, where N is the number of memories in the overall system.

The use of a hash function has to date been deemed necessary in most systems in order thereby to prevent any overloading of memories, which are responsible for common names, since the hash function distributes the names equally. However, so-called range queries, in which it is not the exact name but rather only a prefix of the name, which is given, are thus impossible since names that are similar to one another are scattered widely over the system by hash functions. Moreover, these systems are based on the theory of consistent hashing (cf. D. Karger et al., "Consistent hashing and random trees: Distributed caching protocols for relieving hot spots on the World Wide Web", in Proceedings of the 29$^{th}$ Annual ACM Symposium on Theory of Computing (El Paso, Tex., May 1997), pages 654-663), which takes only insufficient account of the properties of the systems in terms of efficiency and scalability. One known system, which supports range queries, but guarantees the efficiency of routing performance only with a certain level of probability is Mercury (cf. A. Bharambe et al.: "Mercury: Supporting Scalable Multi-Attribute Range Queries", SIGCOMM 2004, Portland, August 2004). The administrative complexity in Mercury for dynamically adapting the routing tables to the load distribution in the system is based on estimation rules for the load of other memories and is disproportionately high.

SUMMARY OF THE INVENTION

The object of the invention is to provide a device and a method for retrieving/storing electronic data in a system with a plurality of data processing units, which each implement a functionality of a read-write memory, particularly with regard to time saving, even if some of the data processing units are unreliable.

The invention is achieved by a device according to independent Claim 1 and a method according to independent Claim 5.

The invention provides a device with a system of a plurality of data processing units, which each comprise a read-write memory for recording/outputting objects containing electronic data with processor means and storage means, and physical data exchange links between the plurality of data processing units, wherein a virtual network is formed in the system, in which network the plurality of data processing units are provided as a series arrangement containing a sequence of a plurality of memories, in which a first memory is arranged next to a last memory, and, in which in each of the plurality of memories a routing table, which contains entries comprising electronic reference information concerning communication links between one memory belonging to the routing table and others of the plurality of memories is formed, and each of the plurality of memories is assigned a name range of a corresponding ordered name space for names of the objects, wherein, for each memory (Sx; x=1, 2, . . . ; $1 \leq x \leq n$) of the plurality of memories (S1, . . . , Sn) in the virtual network, the entries $E_{Sx}[j, i]$ ($1 \leq i$, $1 \leq j \leq b$) containing electronic reference information in the corresponding routing table are formed as follows:

entry $E_{Sx}[1, 1]$=reference to communication link to the memory (Sx+1), which is next in the sequence;

entry $E_{Sx}[2, 1]$=entry $E_{Sx+1}[1, 1]$

. . .

entry $E_{Sx}[j, 1]$=entry $E_{Sv}[k, 1]$=in a further memory (Sv), to which an entry $E_{Sx}[m, 1]$ in the memory (Sx) refers, wherein 2<j<b, 0<k, m and k+m=j.

entry $E_{Sx}[1, i]$=entry $E_{Sv}[k, i]$ in a further memory (Sv), to which an entry $E_{Sx}[m, i-1]$ in the memory (Sx) refers, wherein 1<i, 0<k, m and k+m=b.

. . .

entry $E_{Sx}[j, 1]$=entry $E_{Sv}[k, i]$ in a further memory (Sv), to which an entry $E_{Sx}[m, i]$ in the memory (Sx) refers, wherein $2 \leq j < b$, 1<i, 0<k, m and k+m=j.

One embodiment of the invention provides that b=2 is selected and, for each memory (Sx; x=1, 2, . . . ; $1 \leq x \leq n$) of the plurality of memories (S1, . . . , Sn) in the virtual network, the entries $E_{Sx}[k]$ (k=1, 2, . . . ) containing electronic reference information in the corresponding routing table (302) are formed as follows:

entry $E_{Sx}[1]$=reference to communication link to the memory (Sx+1), which is next in the sequence;

entry $E_{Sx}[2]$=entry $E_{Sx+1}[1]$;

. . .

entry $E_{Sx}[m]$=entry $E_{Sv}[m-1]$ in a further memory (Sv), to which an entry $E_{Sx}[m-1]$ in the memory (Sx) refers, wherein $1 < m \leq k$.

With the invention, the positive properties of existing P2P systems are preserved and more powerful query possibilities are created. The properties in terms of efficiency and scalability are always guaranteed since the procedure is carried out exactly and not on the basis of probabilities. Search queries are processed with logarithmic effort in the number of memories. Let N be the number of memories. Through the exact use and determination of entries in the routing tables, which is not based on probabilities as in the systems existing up to now, use is made of at most [$\log_b$ N] (where N is the number of memories in the system) communication links before a sought memory is found, which has stored a corresponding object.

Individual memories can change their responsibilities for storing objects over time. By means of the invention, the search operation works if memories do not know the responsibilities of all the other memories.

The individual memories can enter the system and also leave it again at any time. Due to the low effort in terms of searching and insertion, the system can be scaled practically at will, even with millions of different memories, search queries can still be found using a few dozen communication links. Since the available memory space in the system is the sum over all the memories, it is easy using modern personal computers to create systems, which can operate with billions of data sets.

DESCRIPTION OF PREFERRED EMBODIMENTS OF THE INVENTION

The invention will be explained in more detail below on the basis of examples of embodiments and with reference to the figures of the drawing, in which.

Below is described a method and a device for storing and finding data in a system with a plurality of independent data processing units, which each implement in particular the functionalities of a read-write memory. The proposed procedure partially makes use of concepts, as proposed in connection with Chord, of a distributed hash table (cf. I. Stoica et al.: Chord: a scalable Peer-to-Peer Lookup Protocol for Internet Applications. IEEE/ACM Transactions on Networking. Volume 11, Edition of 1 February 2003, pages 17-32). Chord does not support any range queries. This disadvantage is eliminated by the invention. At the same time, the advantageous properties of Chord in terms of efficiency are preserved in the method proposed here.

Figure 1:
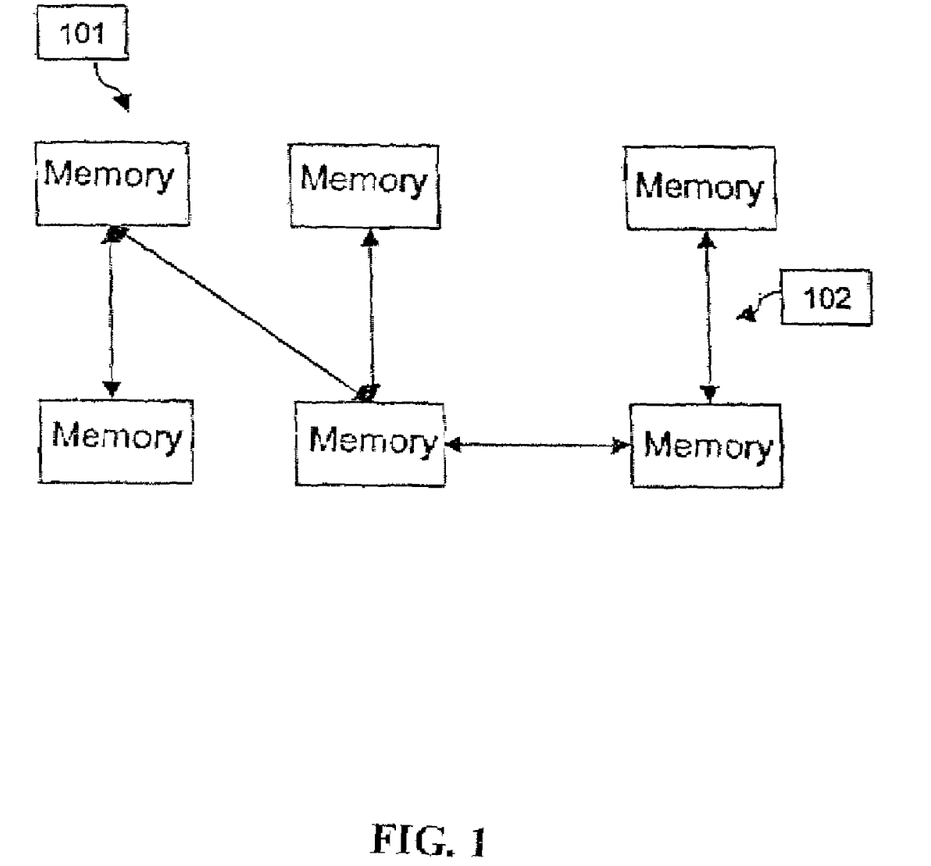
FIG. 1 shows a schematic diagram of a system with a plurality of independent memories, which are connected via communication links.

FIG. 1 shows a schematic diagram of a system, which is for example a computer network with a plurality of independent memories 101, which are designed as read-write memories, and communication links 102 between the memories 101. Electronic data can be exchanged between the memories 101 via the communication links 102. The entirety of the communication links 102 between the memories 101 is referred to as a virtual network ("overlay network"), since the communication links 102 need not coincide with the (physical) communication links in the underlying physical network of data processing units. In the system, data can be written to the plurality of memories 101 and can later be found again for reading purposes by means of a search. Since the memories 101 are designed as read-write memories and it is possible for electronic data to be exchanged between them, the computing capability required for this is also provided in the system, for example by means of suitable processors.

When a memory is to be added to the system with a plurality of memories 101, a communication link has to be set up to any one of the memories 101 already present in the system. Optionally, an overloaded memory of the plurality of memories 101 can be sought by means of a load balancing process, in order to take over part of the corresponding name range (see below) directly from said overloaded memory. The name range of the overloaded memory is then divided into two pars. From this point on, the previously overloaded memory and the added memory are in each case responsible for one of the two parts of the name range. The stored objects of the previously overloaded memory are accordingly split between the two memories. The two memories store information locally for the name range, for which they are now responsible in each case. The two memories then check the set-up of a corresponding routing table, which will be described in detail below.

Since the memories, which form the system with a plurality of memories 101, are not always able to inform in good time that they are leaving the system, this problem can be solved by regular checking and updating of the routing tables.

Figure 2:
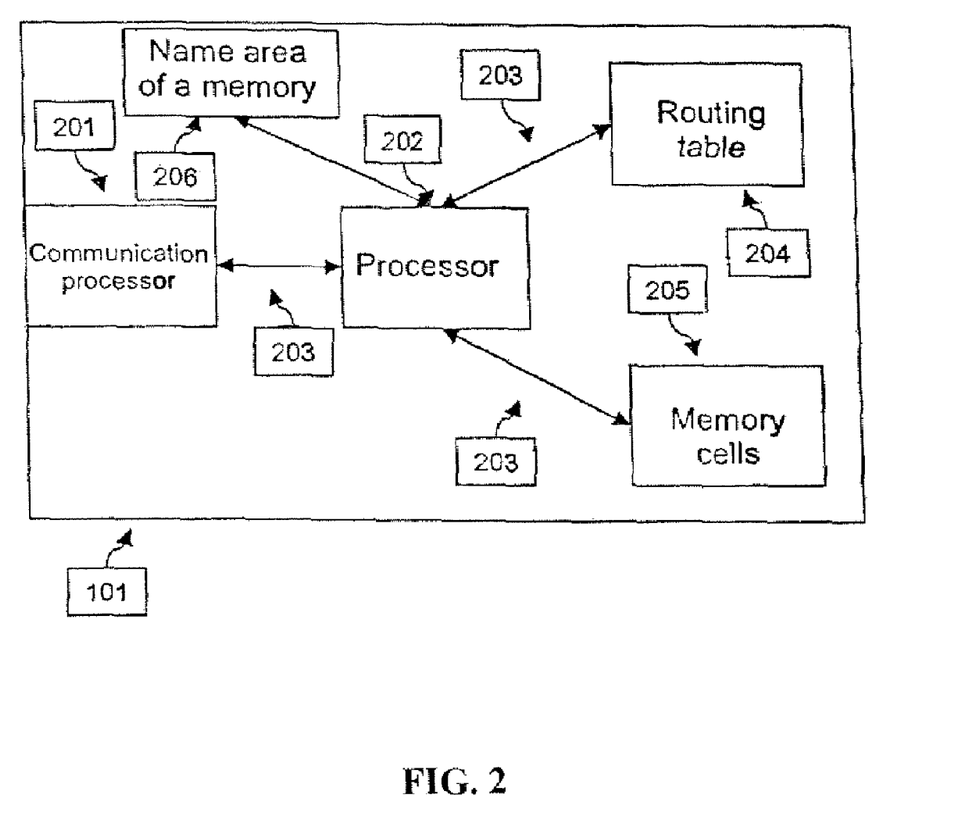
FIG. 2 shows a schematic diagram of components of one of the memories of FIG. 1, in detail.

FIG. 2 shows a schematic diagram of components of one of the memories 101 in FIG. 1, in detail. For the same features, FIG. 2 uses the same reference numerals as in FIG. 1. A communication processor 201, a processor 202, internal communication links 203, a routing table 204, a memory for electronic information concerning a corresponding name range 206, and memory cells 205 are provided. The processor 202 mediates between the communication processor 201 and the memory cells 205. The communication processor 201 is responsible for the communication between the memories 101 via the communication links 102 to other memories 101, for which a respective reference information item is stored in the routing table. The name range of the memory 206 is necessary in order to persistently store the responsibilities of the plurality of memories 101.

Figure 3:
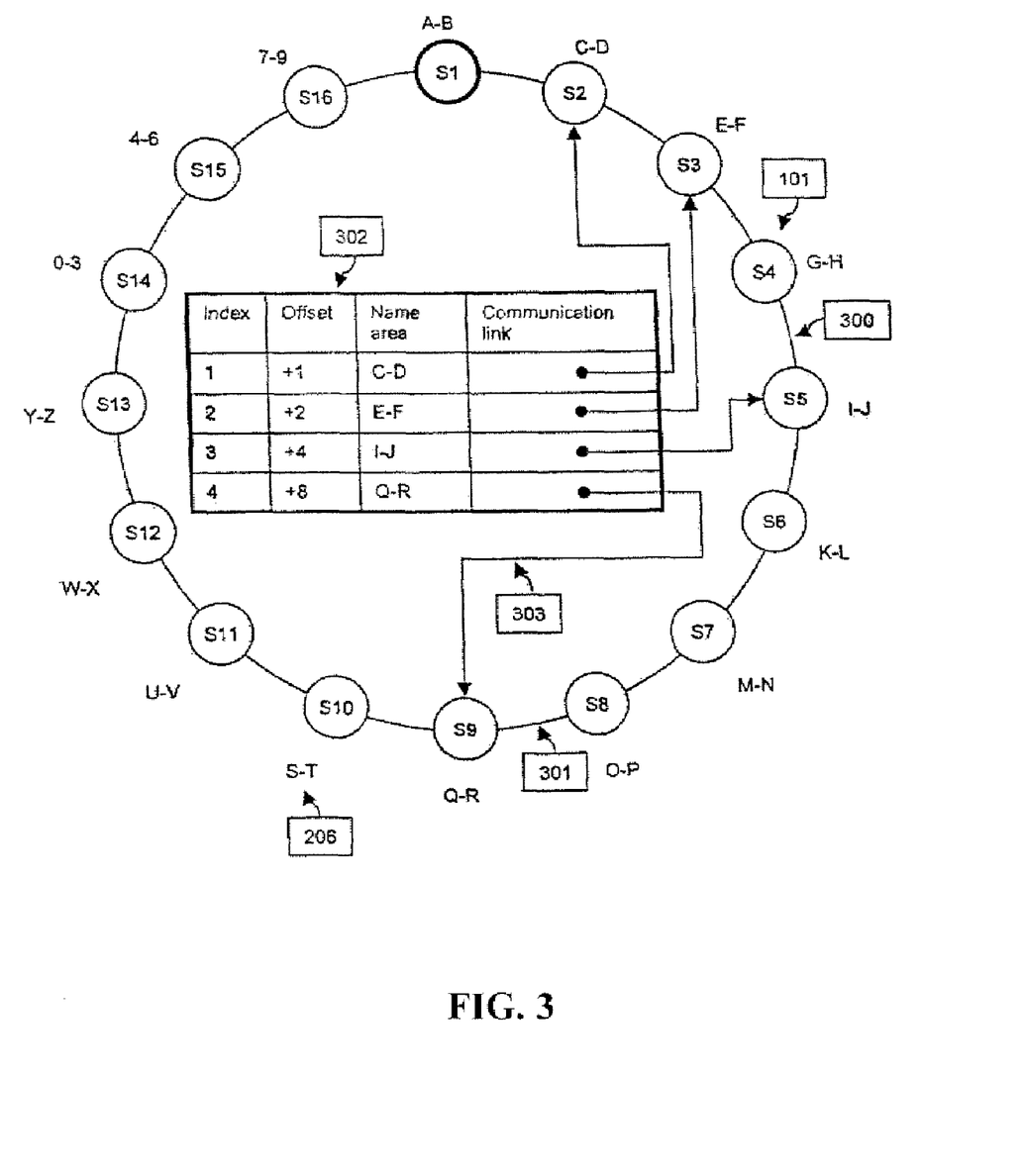
FIG. 3 shows a schematic diagram, in which the plurality of memories of the system of FIG. 1 are arranged on a logic ring and are connected via communication links.

FIG. 3 shows a schematic diagram, in which the plurality of memories 101 of the system of FIG. 1 are arranged on a logic ring 300 and are connected via communication links 301, which partly correspond to the communication links 102 in FIG. 1. The plurality of memories on the ring 300 are denoted Si, where i=1, . . . , 16. For one of the plurality of independent memories S1 on the logic ring 300, a corresponding routing table 302 is shown. The corresponding routing table 302 contains reference information concerning further communication links 303 to others of the plurality of independent memories 101. In the example of embodiment here, this is reference information relating to the memories S2, S3, S5 and S9, as shown in FIG. 3. In this example of embodiment, the spacing between two entries for the communication links doubles until, starting from the memory S1 to which the routing table 302 belongs, half of the rest of the plurality of independent memories 101 in the logic ring 300 is reached. FIG. 3 thus shows a virtual network, which is a suitable electronic model of a corresponding physical computer network, as shown by way of example in FIG. 1.

The search speed, the scalability and the failure safety in the system with a plurality of memories 101 depends on the configuration of the respective routing table 204, which contains electronic information concerning the communication links 102 between the plurality of memories 101. The number of communication links 302, which are entered in the routing table maintained by the corresponding memory 101, can be adapted to the respective use conditions. As described above, the name space is considered as a ring 300 in logic terms (FIG. 3), that is to say the start and the end of the name space are joined or are adjacent to one another. This arrangement results in a natural neighbour-type relationship between the name ranges of the plurality of memories 101/the memories S1, . . . , S16.

Whereas in Chord a hash function is applied to the names of the objects in order to guarantee efficiency properties with a certain level of probability, no hash function is applied in the method proposed here in order to be able to map names in the logic ring 300 while maintaining the order thereof. This, as a matter of fact, is what allows range queries.

If the hash function is omitted in Chord, the objects are distributed unevenly over the ring, that is to say over the data memories available in the system. This then results in memories with a name range, in which a very large number of names is entered and memories with a name range containing fewer names. As a result, the memory cells of the memories are also loaded to varying degrees. For example, if words of the German language are selected as names, in this case the memory cells of the memory, which controls the names starting with the letter "E", would be loaded to a greater degree than the memory cells of the memory, which stores the names starting with the letter "Y". This uneven loading of the memories can be balanced out by means of explicit load balancing, by shifting the boundaries of the name ranges of a memory. However, in the routing method used in Chord, it is assumed that the memories are uniformly distributed. If the name ranges of a memory are then shifted by means of load balancing, in the extreme case the routing performance is reduced from O(log N) to O(N). Such a system can no longer be scaled. The method proposed here overcomes these disadvantages by configuring the routing tables of the memories in a novel manner.

Figure 4:
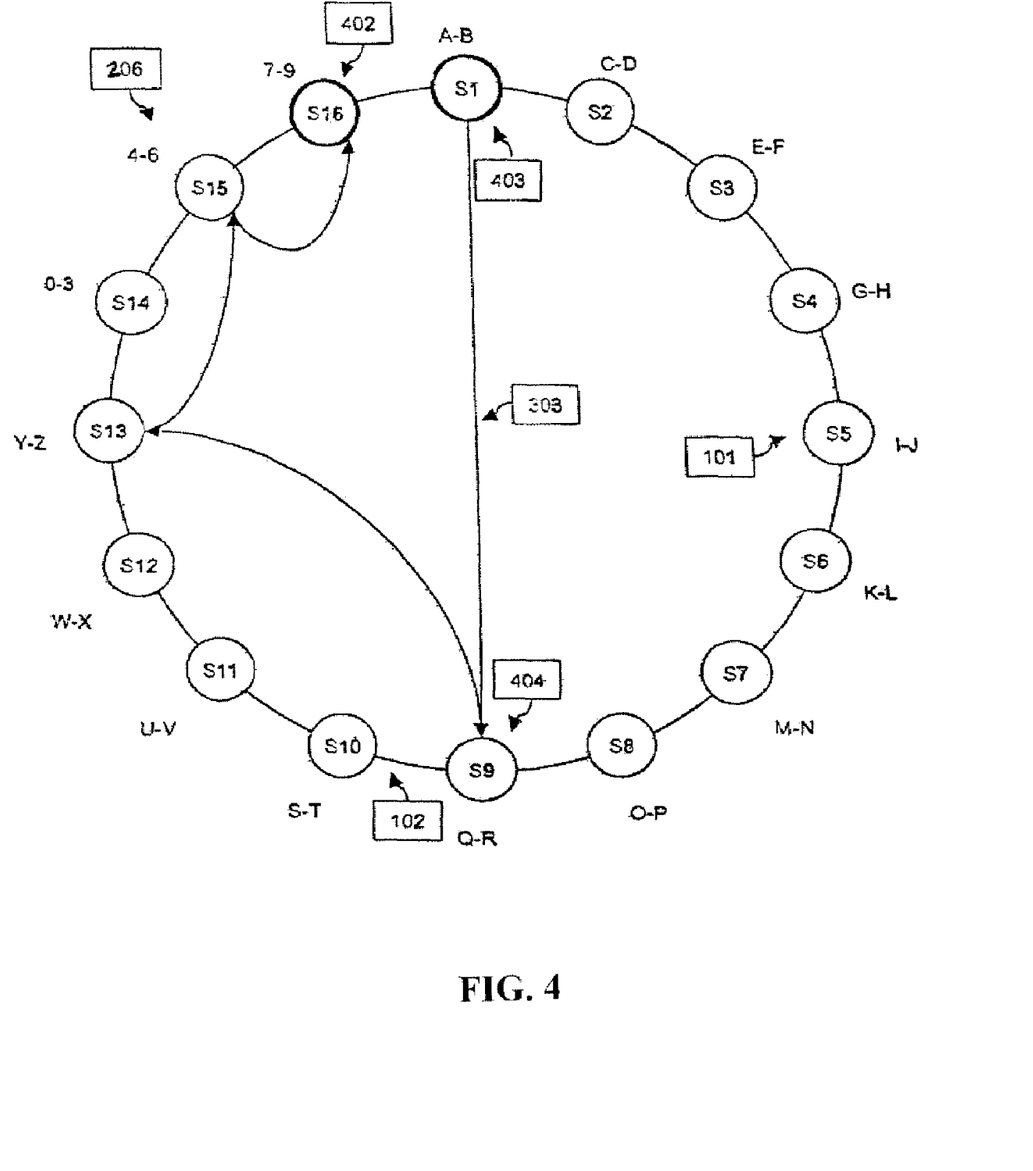
FIG. 4 shows a schematic diagram, which aims at explaining a search query in the system with the plurality of memories of FIG. 1.

FIG. 4 shows a schematic diagram, which aims at explaining a search query in the system of memories formed on the logic ring 300 according to FIG. 3. The plurality of independent memories S1, . . . , S16 in each case have a name range in a name space, for which they are responsible.

Each object, which is stored or is to be stored as a set of electronic data in the system with the plurality of memories S1, . . . , S16 is assigned a name, via which a search for said object can be carried out. The set of valid names forms the name space. A total order is defined on the name space, that is to say that, for each pair of names, a decision can be made as to which one is "smaller". This is a prerequisite if range queries are to be supported. This may be achieved for example by interpreting the bit format of the name as a binary number. If names are strings of characters, it is also possible for example to use the lexicographical order. If, for example, the set of all colours is selected as the name space, there is no need to define whether "midnight blue" is smaller or larger than "sky blue". In this case, an artificial order is sufficient, for example a colour temperature, or in other cases a lexicographical or decimal Dewey order.

The name space is divided into continuous, disjoint name ranges, so that the whole name space is covered. Each of the memories S1, ..., S16 is assigned such a name range. The size of this name range of a memory can be selected at will. For example, small memories of the plurality of memories S1, ..., S16 can be assigned a smaller name range than larger memories. The first name range of a memory is deemed to be joined to the last name range of a memory. The entirety of the name ranges thus forms a virtual ring. This ring does not need to be reflected in the physical network between the memories 101.

Since both the number of memories S1, ..., S16 and their query and capacity load can change, the individual name ranges of a memory 206 are readapted at certain time intervals or as required, in terms of both number and size. If, for example, one of the memories S1, ..., S16 notices that it has an excessive load, that is to say its number of unoccupied memory cells 205 runs short, it initiates a load balancing operation. For the method described here, it is not important, which specific process is used for the load balancing operation. By way of example, part of the name range, for which an overloaded one of the plurality of memories S1, ..., S16 is responsible, can be passed on to an adjacent memory in the logic ring 300.

Both an insertion and a search operation consists in finding that one of the memories S1, ..., S16 with the object sought, in which the name of the object sought falls within the name range of this memory, and in accessing this memory with the object sought via one of the communication links 102.

Each of the memories S1, ..., S16, which correspond to the plurality of memories 101 in FIG. 1, can carry out for an object both a search operation and an insertion operation via the communication links 102, which in FIG. 3 are represented by the communication links 301 and the further communication links 303, and the communication processor 201. If a data processing unit outside the system with the plurality of memories 101 would like to carry out such an operation, it requires a communication link to one of the memories 101, which then acts as a substitute to carry out the operation. The substitute memory can be selected according to various aspects, such as the memory load or spatial proximity for example.

Two types of search can be carried out:
a) The name of the object to be searched for is know
b) All that is known is a name range, in which the name of the object to be searched for is located (range query).

As shown in FIG. 4, a search query to search for an object with the name "8 test" begins from a searching memory 403 (S1), from which the search starts and which decides, based on its corresponding routing table 302 (cf. FIG. 3), to forward the search query via one of the further communication links 303, which is entered in the routing table 204, to the memory S9, which during the search is reached using the further communication link 303. When deciding to which memory the query is to be forwarded, use is made of the routing table 302. In general, the query is forwarded to the memory, which (i) is closest on the virtual ring 300 to the memory containing the object sought (S16) and (ii) is listed in the routing table 302. The distance between two of the memories S1, ..., S16 is measured in the clockwise direction or in the counterclockwise direction and is proportional to the number of names lying therebetween.

In this way, the logic ring 300 is halved when forwarding to the memory S9. The memory S9 makes use of information that is available to it concerning the logic ring 300. Specifically, the memory S9 can make use of electronic information, which states that the name "8 test" is located in the second half of the ring with the memories S9 to S16. Therefore, according to a reference contained in the routing table for the memory S9, a jump is made via a communication link to the memory S13. The memory S13 and others of the plurality of independent memories S1, ..., S16 proceed in the same manner, until the search query arrives at the memory S16 containing the object sought, which has stored the object sought in its memory cells 205 (cf. FIG. 2) and sends the object back to the searching memory 403 (S1).

Range queries are based on simple searches. If, for example, a search is carried out for all objects, which names are between A and C, firstly a search is carried out for the memories, which are responsible for A/C. All the memories, which are located between these two memories on the virtual ring 300 are then asked for the objects with names between A and C.

Figure 5:
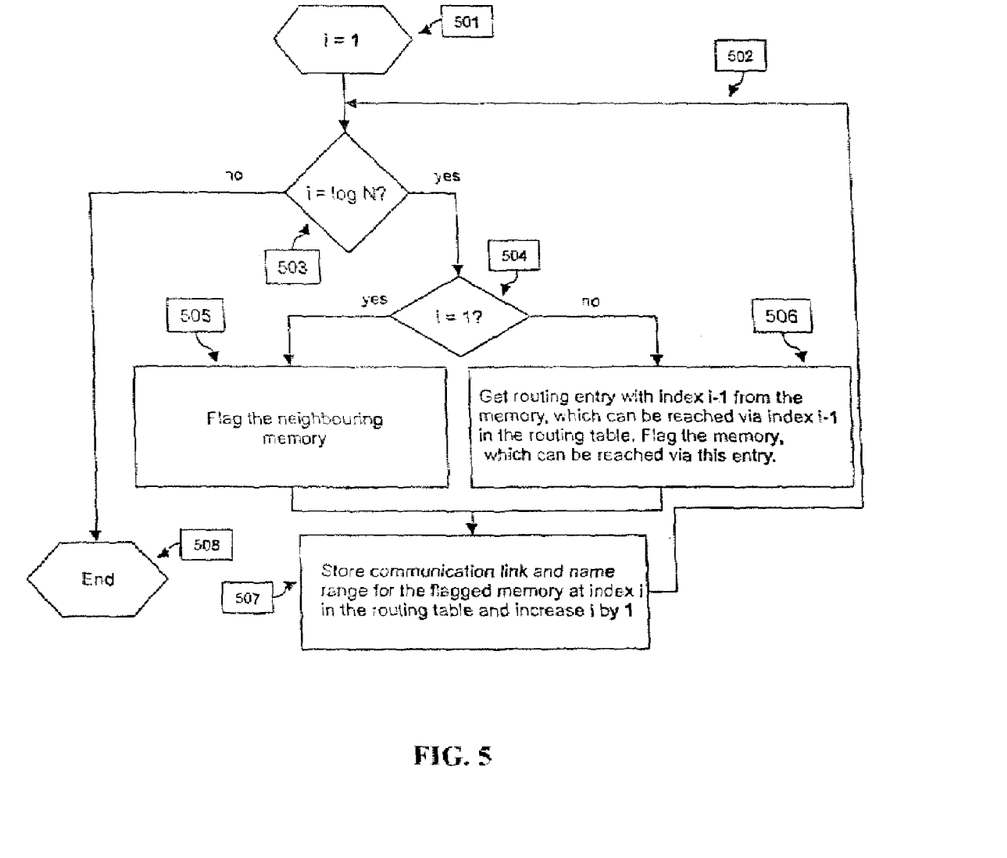
FIG. 5 shows a schematic diagram, which aims at explaining a procedure for filling a routing table.

FIG. 5 shows a schematic diagram, which aims at explaining a procedure for the filling of a routing table 204 by the processor 202 (cf. FIG. 2). The procedure begins with an initialization of a counter 501. The counter controls how often a loop 502 is run through. Each run through the loop begins with the checking for any break in a loop 503, then a check 504 takes place in order to ascertain whether this is a first run through the loop. If this is the first run through the loop, the next step is to flag 505 the communication link to the neighbouring memory; otherwise, the step consists in flagging 506 the communication link to the memory at twice the distance away. Finally, the flagged communication link is stored 507 in the routing table. When the method reaches the end 508, the procedure is terminated.

Initially, only the neighbouring memory in the clockwise direction is known (the method also works in the same way in the counterclockwise direction). The method will firstly be explained here with b=2. The k entries in the routing table are numbered consecutively starting with the index 1. The first table entry is always the aforementioned direct neighbour. The following entries are in each case calculated by means of the preceding entries. In order to calculate an entry having the index m in the routing table of a memory Sx, use is made of the preceding entry, that is to say the entry having the index m−1 of the memory Sx. Via the corresponding communication link, which is entered in the routing table, a memory Sy is asked, which memory is reached via the communication link entered in its corresponding routing table with the index m−1. Let this be a memory Sz. A communication link to this specific memory Sz is then entered at position m of the original memory Sx, which can be summarized as follows:

entry $E_{Sx}[1]$=reference to communication link to the memory (Sx+1), which is next in the sequence;
entry $E_{Sx}[2]$=entry $E_{Sx+1}[1]$;
entry $E_{Sx}[m]$=entry $E_{Sv}[m-1]$ in a further memory (Sv), to which an entry $E_{Sx}[m-1]$ in the memory (Sx) refers, wherein $2 < m \leq k$.

In this way, use is made of the electronic information distributed in the routing tables of the memories. A memory close to the query target, in which the name of the object sought is stored, possesses more accurate information about the distribution of the memories in its direct vicinity than the searching memory. In this way, the invention described here makes it possible to omit the hash function used in Chord and other P2P systems, without losing the positive properties thereof, such as scalability, fault tolerance or the like.

Table 1 shows by way of example at least part of the set-up of a routing table for one of the memories S1. The entry "current memory+16" is to be read as the $16^{th}$ neighbour of the current memory; in addition, the corresponding name range is stored for each of the memories 101. By means of this method, each of the memories 101 can be found on average using a number of 0.5 log 2 N of the communication links 102, wherein N is the total number of the plurality of memories 101 in the system.

TABLE 1

| | Routing entries (offset = 1) | |
|---|---|---|
| Index | Communication link | Name range |
| 1 | current memory + 1 | corresponding name range |
| 2 | current memory + 2 | corresponding name range |
| 3 | current memory + 4 | corresponding name range |
| 4 | current memory + 8 | corresponding name range |
| ... | ... | ... |
| k | Current memory + $2^{k-1}$ | corresponding name range |

The method also works with other topologies such as, for example, hypercubes, space-filling curves, hierarchical rings or multidimensional tori. The more communication links a memory has stored in its corresponding routing table, the greater the efficency.

table 204 is expanded to b−1 columns and $\log_b N$ rows. The $j^{th}$ entry in the $i^{th}$ row then indicates the $jb^{i-1}$th neighbour of the current memory 101 ($1 \leq i \leq [\log_b n]$, $1 \leq j < b$, $1 < b$), which according to the notation used above can be summarized as follows:

entry $E_{Sx}[1, 1]$=reference to communication link to the memory (Sx+1), which is next in the sequence;

entry $E_{Sx}[2, 1]$=entry $E_{Sx+1}[1, 1]$ entry $E_{Sx}[j, 1]$=entry $E_{Sv}[k, 1]$ in a further memory (Sv), to which an entry $E_{Sx}[m, 1]$ in the memory (Sx) refers, wherein 2<j<b, 0<k, m and k+m=j;

entry $E_{Sx}[1, i]$=entry $E_{Sv}[k, i-1]$ in a further memory (Sv), to which an entry $E_{Sx}[m, i-1]$ in the memory (Sx) refers, wherein 1<i, 0<k, m and k+m=b;

. . .

entry $E_{Sx}[j, i]$=entry $E_{Sv}[k, i]$ in a further memory (Sv), to which an entry $E_{Sx}[m, i]$ in the memory (Sx) refers, wherein $2 \leq j < b$, 1<i, 0<k, m and k+m=j.

If a number of alternative processes exist for one entry, that is to say a number of solutions exist for k+m=j or k+m=b, the results of the different processes can be compared and can be used to check the correctness of the entries. If the results differ from one another, at least one of the entries concerned is incorrect. In this case, the entries themselves, which were used for the calculation can be recalculated, or can be checked in the same way.

TABLE 2

| | Routing entries (offset = 1) | | Routing entries (offset = 2) | | Routing entries (offset = 3) | |
|---|---|---|---|---|---|---|
| Index | Communication link | Name range | Communication link | Name range | Communication link | Name range |
| 1 | current memory + 1 | corresponding name range | current memory + 2 | corresponding name range | current memory + 3 | corresponding name range |
| 2 | current memory + 4 | corresponding name range | current memory + 8 | corresponding name range | current memory + 12 | corresponding name range |
| 3 | current memory + 16 | corresponding name range | current memory + 32 | corresponding name range | current memory + 48 | corresponding name range |
| 4 | current memory + 64 | corresponding name range | current memory + 128 | corresponding name range | current memory + 192 | corresponding name range |
| 5 | current memory + 256 | corresponding name range | current memory + 512 | corresponding name range | current memory + 768 | corresponding name range |
| ... | ... | ... | ... | ... | ... | ... |
| K | current memory + offset*$4^k$ | corresponding name range | current memory + offset*$4^k$ | corresponding name range | current memory + offset*$4^k$ | corresponding name range |

Table 2 shows this by way of example, by increasing the number of communication links in the routing table of each memory in the system and thereby reducing the number of communication links used for a search to an average of 0.5 $\log_4 N$. For systems, which use an average of 0.5 $\log_b N$ communication links 102 in order store objects, the routing When starting the virtual network, many entries initially contain no entries or contain incorrect entries, apart from those concerning the directly adjacent memories having the index 1. If then firstly all the memories adapt the entries having the index 2, followed by those having the index 3, and so on, all the entries in the routing table are then corrected.

While the system is running, new memories 101 will be added and old ones will be removed, as a result of which the entries continually have to be updated. The updates may be carried out at periodic time intervals or based on certain events, for example if a search requires on average more than $0.5 \log_b N$ steps.

Optionally, the search operations can be used to update the information in the routing tables. In the following, it will be assumed that the objects sought are sent back on the same path as was used for the search, that is to say indirectly. If, for example, the processor 202 (cf. FIG. 2) of a memory Sx decides to forward the current search query to the memory Sy, which is at the $i^{th}$ position in its corresponding routing table 204, it may also transmit this information at the same time. Once the objects sought have been found and sent back via the same path, the memory Sy can forward the $i^{th}$ entry from its corresponding routing table 204 to the memory Sx, which the memory Sx uses to update its routing table 204 at the position i+1. This process does not significantly increase the effort required for search queries and automatically updates the routing entries.

The features of the invention, which have been disclosed in the above description, the claims and the drawing may be relevant both individually and in any combination with one another for implementing the invention in its various embodiments.

The invention claimed is:

1. A system, comprising:
a plurality of memories, wherein each comprises a read-write memory for recording and outputting objects comprising electronic data with a processor and a storage device, and physical data exchange links between a plurality of data processing units, wherein
a virtual network is formed, in which the plurality of data processing units are provided as a series arrangement with a sequence of a plurality of memories (S1, ..., Sn; n>1), in which a first memory (S1) is arranged next to a last memory (Sn), and in which a routing table is formed in each of the plurality of memories (S1, ..., Sn), which table includes entries comprising electronic reference information concerning communication links between one memory corresponding to the routing table and others of the plurality of memories (S1, ..., Sn), and
each memory of the plurality of memories (S1, ..., Sn) is assigned a name range of a corresponding ordered name space for names of the objects, wherein, for the each memory (Sx; x=1, 2, ...; $1 \leq x \leq n$) of the plurality of memories (S1, ..., Sn) in the virtual network, entries $E_{Sx}[j, i]$ ($1 \leq i$, $1 \leq j < b$) containing the electronic reference information in the corresponding routing table are formed as follows:
entry $E_{Sx}[1, 1]$=reference of a communication link to a memory (Sx+1), which is next in the sequence;
entry $E_{Sx}[2, 1]$=entry $E_{Sx+1}[1, 1]$
entry $E_{Sx}[j, 1]$=entry $E_{Sv}[k, 1]$ in a further memory (Sv), to which an entry $E_{Sx}[m, 1]$ in the memory (Sx) refers, wherein $2<j<b$, $0<k$, m and k+m=j;
entry $E_{Sx}[1, i]$=entry $E_{Sv}[k, i-1]$ in the further memory (Sv), to which an entry $E_{Sx}[m, i-1]$ in the memory (Sx) refers, wherein $1<i$, $0<k$, m and k+m=b;
entry $E_{Sx}[j, i]$=entry $E_{Sv}[k, i]$ in the further memory (Sv), to which an entry $E_{Sx}[m, i]$ in the memory (Sx) refers, wherein $2 \leq j < b$, $1 < i$, $0 < k$, m and k+m=j.

2. The system according to claim 1, wherein the corresponding routing table contains entries $E_{Sx}[j, i]$, wherein $1 \leq i \leq [\log_b n]$, $1 \leq j < b$.

3. The system according to claim 1, wherein b=2 is selected and, for the each memory (Sx; x=1, 2, ...; $1 \leq x \leq n$) of the plurality of memories (S1, ..., Sn) in the virtual network, entries $E_{Sx}[k]$ (k=1, 2, ...) containing the electronic reference information in the corresponding routing table are formed as follows:
entry $E_{Sx}[1]$=reference of the communication link to the memory (Sx+1), which is next in the sequence;
entry $E_{Sx}[2]$=entry $E_{Sx+1}[1]$;
entry $E_{Sx}[m]$=entry $E_{Sv}[m-1]$ in the further memory (Sv), to which an entry $E_{Sx}[m-1]$ in the memory (Sx) refers, wherein $2 < m \leq k$.

4. The system according to claim 3, wherein the corresponding routing table contains entries $E_{Sx}[1], E_{Sx}[2], ..., E_{Sx}[m]$, wherein $m=[\log_2 n]$.

5. A method for searching for a data processing unit in order to store an object comprising electronic data in the data processing unit and to retrieve the object from the data processing unit, in a system of comprising a plurality of data processing units, which each comprise a read-write memory for recording and outputting the object with processor means and storage means, and physical data exchange links between the plurality of data processing units, wherein
a virtual network is formed in the system, in which the plurality of data processing units are provided as a series arrangement with a sequence of a plurality of memories (S1, ..., Sn; n>1), in which a first memory (S1) is arranged next to a last memory (Sn), and, in which in each of the plurality of memories (S1, ..., Sn) a routing table is formed, which table includes entries comprising electronic reference information concerning communication links between one memory corresponding to the routing table and others of the plurality of memories (S1, ..., Sn), and
the each memory of the plurality of memories (S1, ..., Sn) is assigned a name range of a corresponding ordered name space for names of the objects,
detecting a search query for the object in the system, and triggering the object by the detected search query, the data processing unit being determined on the basis of a electronic reference information in the routing table, and
wherein for the each memory (Sx; x=1, 2, ...; $1 \leq x \leq n$) of the plurality of memories (S1, ..., Sn) in the virtual network, the electronic reference information in entries $E_{Sx}[j, i]$ ($1 \leq i$, $1 \leq j < b$) in the corresponding routing table is formed as follows:
entry $E_{Sx}[1, 1]$=reference of the communication link to the memory (Sx+1), which is next in the sequence;
entry $E_{Sx}[2, 1]$=entry $E_{Sx+1}[1, 1]$
entry $E_{Sx}[j, 1]$=entry $E_{Sv}[k, 1]$ in a further memory (Sv), to which an entry $E_{Sx}[m, 1]$ in the memory (Sx) refers, wherein $2<j<b$, $0<k$, m and k+m=j.
entry $E_{Sx}[1, i]$=entry $E_{Sv}[k, i-1]$ in the further memory (Sv), to which an entry $E_{Sx}[m, i-1]$ in the memory (Sx) refers, wherein $1<i$, $0<k$, m and k+m=b.
entry $E_{Sx}[j, i]$=entry $E_{Sv}[k, i]$ in the further memory (Sv), to which an entry $E_{Sx}[m, i]$ in the memory (Sx) refers, wherein $2 \leq j < b$, $1 < i$, $0 < k$, m and k+m=j.

6. The method according to claim 5, wherein the corresponding routing table contains entries $E_{Sx}[i, j]$, wherein $1 \leq i \leq [\log_b n]$, $1 \leq j < b$.

7. The method according to claim 5, wherein b=2 is selected and, for each memory (Sx; x=1, 2, ...; $1 \leq x \leq n$) of the plurality of memories (S1, ..., Sn) in the virtual network, the electronic reference information in entries $E_{Sx}[k]$ (k=1, 2, ...) in the corresponding routing table is formed as follows:

entry $E_{SX}[1]$=reference of the communication link to the memory (Sx+1), which is next in the sequence;

entry $E_{SX}[2]$=entry $E_{SX+1}[1]$;

entry $E_{SX}[m]$=entry $E_{SV}[m-1]$ in the further memory (Sv), to which an entry $E_{SX}[m-1]$ in the memory (Sx) refers, wherein 2<m≦k.

8. The method according to claim 7, wherein the corresponding routing table contains entries $E_{SX}[1]$, $E_{SX}[2]$, ..., $E_{SX}[m]$, wherein m=[$\log_2$ n].

9. The method according to claim 5, wherein at least apart of the entries $E_{SX}[k]$ (k=1, 2, ...)/$E_{SX}[j, i]$ (1≦i, 1≦j<b, 1<b) in the corresponding routing table are updated in at least a part of the plurality of memories (S1, ..., Sn) when a data processing unit is added to the system.

10. The method according to claim 5, wherein at least a part of the entries $E_{SX}[k]$ (k=1, 2, ...)/$E_{SX}[j, i]$ (1≦i, 1≦j<b, 1<b) in the corresponding routing table are updated in at least a part of the plurality of memories (S1, ..., Sn) when it is detected that a data processing unit has left the system.

11. The method according to claim 5, wherein entries $E_{SX}[k]$ (k=1, 2, ...)/$E_{SX}[j, i]$ (1≦i, 1≦j<b, 1<b) in the corresponding routing table are updated in at least a part of the plurality of memories (S1, ..., Sn) at predefined time intervals.

12. The method according to claim 5, wherein the assignment to the name ranges is changed for at least a part of the plurality of memories when there is less than a certain number of free storage devices.

13. The method according to claim 5, wherein at least a part of the entries $E_{SX}[k]$ (k=1, 2, ...)/$E_{SX}[j, i]$ (1≦i, 1≦j<b, 1<b) in the corresponding routing table are updated automatically by data, which are collected during search operations.

14. The method according to claim 5, wherein different values of k and m for which k+m=b are used in order to check the equality of at least a part of the entries $E_{SX}[j, i]$ (1≦i, 1≦j<b, 1<b) for different values, and to update at least the part of the entries $E_{SX}[j, i]$ (1≦i, 1≦j<b, 1<b) in at least a part of the plurality of memories (S1, ..., Sn) in the event of any differences.

* * * * *

UNITED STATES PATENT AND TRADEMARK OFFICE
CERTIFICATE OF CORRECTION

PATENT NO. : 7,623,511 B2  Page 1 of 1
APPLICATION NO. : 11/485904
DATED : November 24, 2009
INVENTOR(S) : Reinefeld et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Twenty-sixth Day of October, 2010

David J. Kappos
*Director of the United States Patent and Trademark Office*